Dec. 21, 1948.　　　　E. N. BURROWS　　　　2,456,912

COLLAPSIBLE AND ADJUSTABLE FILTER AND STRAINER

Filed March 22, 1945

Inventor

Edwin N. Burrows

By Barthel & Bugbee

Attorneys

Patented Dec. 21, 1948

2,456,912

UNITED STATES PATENT OFFICE 2,456,912

COLLAPSIBLE AND ADJUSTABLE FILTER AND STRAINER

Edwin N. Burrows, Detroit, Mich.

Application March 22, 1945, Serial No. 584,105

2 Claims. (Cl. 210—161)

The present invention relates to improvements in filters and more particularly, to adjustable filters.

The primary object of the invention is to provide a filter and strainer for filtering fluid material such as paint which may be adjusted to fit receptacles of various diameters and shapes.

Another object of the invention is to provide a filter or strainer for fluid material which can be readily adjusted to accommodate paint cans or receptacles of various diameters by folding the frame portion of the filter on prearranged radial fold lines to reduce or increase the circumference of the frame portion without cutting the frame portion or the reticulate screening and filtering element carried thereby.

Another object of the invention is to provide a strainer or filter in which the frame portion is formed of flexible material such as heavy paper cardboard to permit the easy folding and flexing thereof when the strainer is adjusted to increase or decrease the diameter and circular size thereof.

Another object of the invention is to provide a strainer and filter of the above-mentioned type which may be adjusted to fit various receptacle diameters and circular sizes and which can be held in the desired adjusted position by a retaining tab carried by the frame portion and engageable with the overlapping folded portion of the frame structure to securely hold the filter in its position of adjustment.

Another object of the invention is to provide a filter and strainer which is economical to manufacture and easy to construct and is composed of a comparatively small number of parts to become broken and damaged.

Other objects and advantages of the invention will become apparent during the course of the following description of the accompanying drawing wherein.

Figure 1:
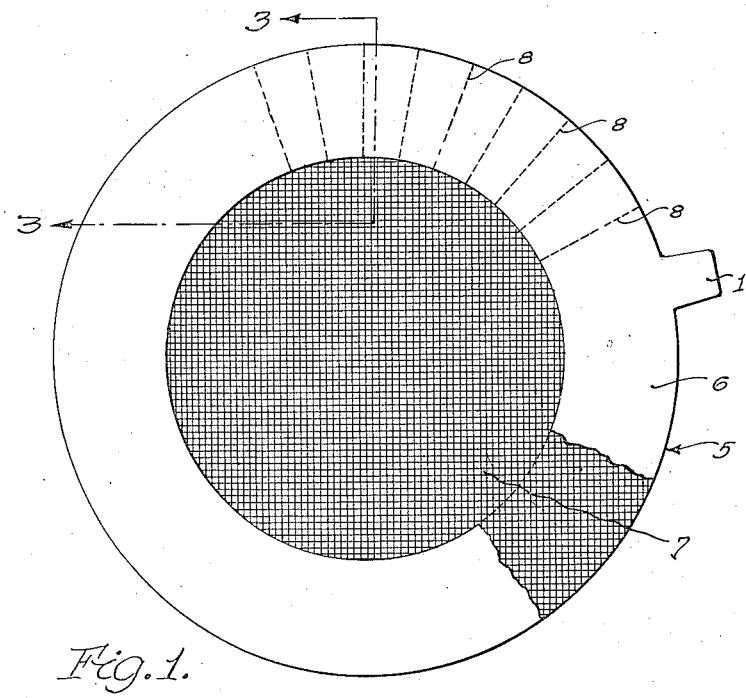
Figure 1 is a top plan view of the filter embodying the invention showing the various radially extending fold lines in the frame portion thereof.
Figure 2:
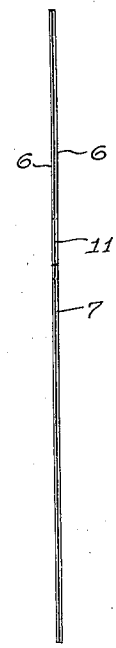
Figure 2 is an end elevational view showing the manner in which the flexible filtering material is sandwiched between flexible frame members.
Figure 4:
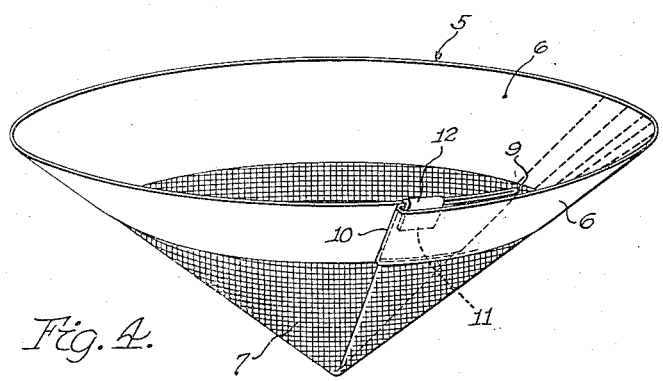
Figure 3:
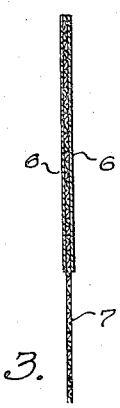

Figure 3 is an enlarged cross sectional view taken on the vertical line 3—3 of Figure 1 looking in the direction of the arrow and further illustrating the manner in which the reticulate filtering element is positioned between the circular frame members; and Figure 4 is a perspective view of the filtering element and the strainer showing the same in one of its folded adjusted positions and the manner in which the overlapping fold portion is held by means of a retaining tab.

In the drawing, attention is first directed to Figure 1 wherein there is shown a filter and strainer in its expanded position to accommodate a receptacle of maximum diameter. The reference character 5 will generally be employed to designate a circular frame portion including a pair of annular ring-like members 6 formed of paper, heavy cardboard or similar flexible and resilient material. Sandwiched between the circular frame members 6 is a reticulate strainer and filter screen 7 which is held between the circular frame members 6 by an adhesive or other fastening means.

The circular frame portion 5 is provided with scored lines 8 to provide radially extending circumferentially spaced fold lines which may be bent as shown in Figure 4 on one of the lines 8 as at 9 and on another of said lines as at 10. By increasing or decreasing the number of included fold lines, it will be seen that the circular size of the frame portion 5 will be increased or decreased accordingly and while it is desirable to fold the frame portion 5 at spaced intervals with two or more fold lines included, the frame portion may be bent by simply folding the frame portion on the second and third fold lines or multiples thereof.

Formed integral with the circular frame portion 5 is a locking or retaining tab 11 which is adapted to be bent as at 12 to extend over the fold portion between the folds 9 and 10 (Figure 4). It will thus be seen that after the circular frame portion 5 has been folded to the desired circular size and diameter by bending the same on various fold lines 8, the tab 11 will anchor the folded portion in place and form a substantially conical filtering element as shown in Figure 4. It is to be understood that the reticulate screen portion 7 is formed of cloth or other flexible material so as to fold with the frame portion 5 along lines extending radially from the center of said reticulate screen member to the peripheral portion thereof.

The scored lines 8 may be formed by a suitable cutter and if desired, may extend the entire circumference of the circular frame member 5 to permit the filter to be folded to relatively small diameters so as to fit paint cans and the like having relatively small openings.

The reticulate screen 7 may be formed of cloth, wire or suitable material of sufficient flexibility to permit the same to be folded and overlapped along lines radial and coextensive with the fold lines 8.

It is to be understood that the form of the invention herewith shown and described is to be taken as a preferred embodiment of the same and that various changes may be made in the shape, size and arrangement of parts without departing from the spirit of the invention or the scope of the subjoined claims.

What I claim is:

1. An adjustable filter and strainer for varying sizes of receptacles comprising an annular frame member of flexible sheet material with a central aperture therethrough, said frame member being foldable into frusto-conical form along fold lines determined by the size of the receptacle opening and providing reversely folded overlapping portions, a flexible filtering element secured to said frame member across said aperture and foldable along lines approximately co-extensive with the fold lines of said frame member, and an integral locking tab projecting radially outward from the periphery of said frame member and foldable thereover into interlocking engagement between folds of said reversely folded overlapping portion.

2. An adjustable filter and strainer for varying sizes of receptacles comprising a pair of superimposed annular frame members of flexible sheet material with a central aperture therethrough, said frame members being foldable into frusto-conical form along fold lines determined by the size of the receptacle opening and providing reversely folded overlapping portions, a flexible filtering element secured between said superimposed frame members across said aperture and foldable along lines approximately co-extensive with the fold lines of said frame members, and an integral locking tab projecting radially outward from the periphery of said frame members and foldable thereover into interlocking engagement between folds of said reversely folded overlapping portion.

EDWIN N. BURROWS.

REFERENCES CITED

The following references are of record in the file of this patent:

UNITED STATES PATENTS

| Number | Name | Date |
|---|---|---|
| 345,145 | Jones | July 6, 1886 |
| 995,343 | Goodale | June 13, 1911 |
| 1,015,085 | Salstrom | Jan. 16, 1912 |
| 1,247,006 | Reardon | Nov. 20, 1917 |
| 2,171,484 | Squire | Aug. 29, 1939 |
| 2,234,397 | Bentz | Mar. 11, 1941 |
| 2,264,238 | Burdwood | Nov. 25, 1941 |
| 2,273,422 | Schroeder | Feb. 17, 1942 |
| 2,321,639 | Zarbo | June 15, 1943 |
| 2,349,115 | Sanford | May 16, 1944 |
| 2,384,057 | Wetherell | Sept. 4, 1945 |

FOREIGN PATENTS

| Number | Country | Date |
|---|---|---|
| 498,004 | Great Britain | Jan. 2, 1939 |